United States Patent [19]

Schlecht et al.

[11] Patent Number: 5,236,729
[45] Date of Patent: Aug. 17, 1993

[54] OBTENTION AND USE OF COFFEE OIL

[75] Inventors: Klaus Schlecht; Olaf Wehrspann, both of Orbe, Switzerland

[73] Assignee: Nestec S.A., Vevey, Switzerland

[21] Appl. No.: 813,804

[22] Filed: Dec. 26, 1991

[30] Foreign Application Priority Data

Jan. 17, 1991 [CH] Switzerland ................. 00119/91

[51] Int. Cl.⁵ .............................................. A23F 5/46
[52] U.S. Cl. .................................. 426/417; 426/385; 426/386; 426/387; 426/432; 426/434; 426/594
[58] Field of Search ............... 426/385, 386, 387, 434, 426/594, 432, 417

[56] References Cited

U.S. PATENT DOCUMENTS 3,035,921 5/1962 Carver et al. .
3,406,074 10/1968 Klein et al. .

FOREIGN PATENT DOCUMENTS 1532662 11/1978 United Kingdom .

OTHER PUBLICATIONS

Sivetz et al, Coffee Processing Technology, vol. I, 1963, Avi; Westport, Connecticut, pp. 253, 262, 263, 294-296, 481, 484.

Primary Examiner—Joseph Golian

[57] ABSTRACT

Coffee oil is separated from a filtered extract produced by counter-current extraction and the separated oil is incorporated into soluble coffee powder.

12 Claims, No Drawings

OBTENTION AND USE OF COFFEE OIL

BACKGROUND OF THE INVENTION

This invention relates to a process for the production of soluble instant coffee in powder form. More particularly, the invention relates to a process of this type in which coffee oil is obtained during the process and incorporated in coffee powder to obtain a product of enhanced flavour comparable with that of a coffee directly obtained by the percolation of boiling water through a bed of ground roasted coffee.

Soluble coffee powder is conventionally produced by freeze-drying or spray-drying after the evaporation of a coffee extract obtained by the percolation of an extraction liquid through cells filled with ground roasted coffee (Sivetz, Coffee Processing Technology, Vol. 1, pp. 262, 263, AVI, 1963).

When extraction is carried out in a countercurrent fashion, i.e., water under pressure at a temperature of 150° to 180° C. is introduced into a cell containing the batch of ground roasted coffee which has been most intensively extracted (having undergone N extractions) at the bottom of the cell. The liquid extract of this extraction cell is then passed through the extraction cell containing the batch of coffee which has been extracted (N−1) times and so on until the liquid extract passes through the cell which has just been filled with fresh ground roasted coffee.

Although the final extract obtained at the exit of the extraction cell containing the freshest coffee contains only a small quantity of ground coffee particles, fines still being entrained, it is desirable to filter the extract.

Finally, after the filtration phase which eliminates the particles larger than about 1 mm in size, solids, such as polysaccharides, are still present in suspension and are best eliminated to enable a coffee powder which dissolves perfectly without any solids appearing in the cup to be obtained after concentration and freeze-drying or spray-drying of the extract.

The suspended solids are normally eliminated by centrifugation.

The final extract is then concentrated by evaporation and converted into powder form by freeze drying or spray drying.

One of the major problems of this type of process lies in the fact that the product obtained does not have the flavour of a roasted coffee which is due in particular to the evaporation and freeze-drying or spraying-drying steps which inevitably involve significant losses of aromas.

Various solutions have been proposed, comprising either spraying a coffee oil onto the coffee powder or incorporating a coffee oil in a jar filled with soluble coffee powder, for example by means of a syringe.

The coffee oil used may be enriched with coffee aromas, for example from recovery of the aromas of a ground roasted coffee. One process of this type is known, for example, from U.S. Pat. No. 3,406,074.

Hitherto, the coffee oil normally used has been obtained by pressing of a ground roasted coffee before extraction, one such process being described, for example, in British patent specification No. 1,532,662.

However, this method of recovering coffee oil by pressing, although effectively enabling a flavour-rich product to be obtained, is accompanied by a more or less pronounced smell of burning due to the temperature and pressure conditions required for pressing.

In addition, the highly volatile aromas tend nevertheless to escape. In addition, the oil obtained cannot be directly used on account of the large proportion of fine particles so that the oil has to be purified, for example by centrifugation.

Finally, this process involves the formation of a solid residue formed by the ground roasted coffee from which the oil was expressed.

In order not to eliminate this compact solid residue, which can be extracted, it has to be size-reduced so that it may be reintroduced into the coffee extraction columns, which inevitably involves a change in the taste of the end product that is more pronounced, the higher the ratio of recycled solid residue to the total quantity of roasted coffee extracted.

Accordingly, the process in question is complex in the equipment it requires, onerous because, if it is desired not to recycle the solid residue to avoid a change in quality, the cost of the pressed roasted coffee adds to the cost of the starting materials and, finally, is not entirely satisfactory in regard to the oil obtained which, although having a high resistance to oxidation in the crude state, shows distinctly less resistance to oxidation after deodorization with steam. Now, this operation is virtually compulsory due, on the one hand, to the smell of burning produced and, on the other hand, to the use of Robusta coffee to reduce the cost of the starting materials. Now, it is quite clear that it is not desirable directly to use an oil from the pressing of a roasted Robusta coffee for flavouring a coffee powder produced from an Arabica.

In order partly to overcome these disadvantages, it has been proposed to use the coffee grounds after extraction rather than pressing the ground roasted coffee before extraction. One such process is known, for example, from U.S. Pat. No. 3,035,921. However, even if this process avoids the use of non-extracted roasted coffee, the technique used is complex and, in addition, leads to an oil which, in the crude state, is not as stable as that directly produced from roasted coffee.

Accordingly, the problem addressed by the present invention was to enable a process for flavouring a coffee powder, such as that described in U.S. Pat. No. 3,406,074, to be used through the use of a coffee oil which, on the one hand, is even more stable than that produced by pressing of a non-roasted coffee and which, on the other hand, is easier to obtain and does not require the use of an additional source of starting materials.

It has been found that the final liquid extract issuing from the extraction cells contains a quantity of coffee oil of 0.2% to 0.5% by weight, based on the solid material present in the extract.

This oil source, although apparently very poor, has proved very interesting.

Thus, by means of a simple oil-extracting centrifuge arranged after the centrifuge which separates the suspended materials from the liquid extract after the filtration phase, it is possible to obtain approximately 90% of the total quantity of oil present in this extract.

In another embodiment, the two operations can be carried out in a single apparatus which separates the suspended materials, the oil and the liquid extract.

Now, this oil—ultimately readily obtainable—has the advantage of being far more stable than all known coffee oils and, in addition, is highly aromatic.

In sum the present invention provides a process wherein roast and ground coffee is extracted in a countercurrent fashion and then filtered to obtain an extract, coffee oil is separated from the extract and then the oil is incorporated into a soluble coffee powder.

DETAILED DESCRIPTION OF THE INVENTION

Accordingly, the present invention relates to a process for the production of a soluble instant coffee in a powder form in which an extraction liquid is circulated in countercurrent fashion through extraction cells, the liquid extract obtained being filtered and then centrifuged before being concentrated and subsequently converted into powder form, in which the oil contained in the liquid extract is separated during this centrifugation phase so that it can be incorporated into the soluble coffee powder.

The use of the oil present in the liquid extract eliminates the need to use an additional source of roasted coffee, in addition to which this simple process, which may be incorporated in the normal production cycle of coffee powder, requires a minimum of additional steps. Finally, the oil obtained is considerably more stable than all the previously known coffee oils.

It is thus possible by the process according to the invention to obtain an oil having a purity of 96% to 99% which eliminates the need for subsequent purification, for example by centrifugation, contrary to what happens in the case of an oil produced by pressing of a ground roasted coffee.

In addition, it has been found that there is an optimal temperature for achieving maximum recovery of the oil contained in the extract. More precisely, the optimal yield is obtained with an extract at a temperature of 70° to 80° C. In one embodiment of the invention, therefore, the liquid extract is reheated to that temperature before entering the oil-extracting centrifuge.

It has also been found that, in some cases, the oil obtained—after spraying onto the coffee powder or after injection by syringe into a jar containing the coffee powder—can produce a smell of grounds in the jar containing the coffee powder after a few months.

It may therefore be desirable to deodorize the oil. This treatment may be carried out in one or two steps.

If the treatment is carried out in a single step, the oil is deodorized by distillation with steam.

In this step, the ratio by weight of steam to oil is preferably 50:1 and the residence time of the oil in a tenplate distillation column is preferably one hour. This treatment enables an organoleptically neutral oil to be obtained. The fraction of condensed water in the oil is then separated by centrifugation.

However, it has been found that, if the crude oil is deodorized immediately after centrifugation, a precipitate is sometimes formed in the apparatus so that preliminary degumming is necessary in this case.

It is for this reason that, in an optional preliminary step, the quantity of gums present in the oil is reduced by the high-speed injection of steam. In this step, steam at 140° C./3–4 bar is injected into the oil, producing an immediate increase in the temperature of the oil which is maintained for two to three minutes. The oil is then rapidly cooled to 90°-100° C. and the gums precipitated and the water are eliminated, for example by centrifugation. The oil is then subjected to the deodorizing treatment mentioned above.

The oil from the liquid extract, optionally deodorized by the process described above, is then sprayed onto a coffee powder or injected into a jar containing the coffee powder, if necessary after having been enriched with coffee aromas.

It is possible in this way to obtain a soluble coffee powder to which an aromatic oil has been fixed to provide the product obtained with stable organoleptic qualities.

EXAMPLES

The following Examples illustrate the characteristics of the oil and these properties by comparison with hitherto known coffee oils.

EXAMPLE 1

This Example illustrates the stability of the oil produced by comparison with other known coffee oils. It is based on an oxidation resistance test using the Rancimat method at 130° C. In this test, high-purity air is passed at a predetermined rate through the sample of oil heated to the desired temperature. The volatile oxidation products, such as the organic acids and the aldehydes, are entrained with the flow of air into a device filled with distilled water where they dissolve in the water. In this device, the conductivity of the water which is dependent on the quantity of dissolved oxidation products is continuously measured and recorded. The curve reflecting the increase in conductivity enables a stability factor, expressed in hours for a given temperature, to be determined.

Measurements were conducted both on crude oils and on oils deodorized with steam.

| Oil | Stability (in hours) |
| --- | --- |
| Oil acc. to the invention | 12.9 |
| Oil acc. to the invention, deodorized | 10.6 |
| Oil from grounds | 7.3 |
| Oil from grounds, deodorized | 4.1 |
| Oil from grounds, dried, pressed | 2 |
| Oil from grounds, dried, pressed, deodorized | 1.8 |
| Oil from roasted coffee, pressed | 9.8 |
| Oil from roasted coffee, pressed, deodorized | 3.9 |

EXAMPLE 2

This Example illustrates the total organic carbon content (expressed in mg per 100 g dry matter) of the volatile fraction—distilled with steam and condensed—of various oils.

The total organic carbon content is dependent on the aroma content and hence reflects the richness of an oil in aromas.

| Oil | Total organic carbon content |
| --- | --- |
| Oil acc. to the invention | 281 |
| Oil from grounds | 19 |
| Oil from roasted coffee | 573 |

It is thus clearly apparent that this oil, even if no the most aromatic, is nevertheless very rich i aromas.

EXAMPLE 3

This Example illustrates the influence of the temperature of the treated liquid extract on the quantity of oil recovered in relation to the quantity of oil contained in the extract.

| Temperature (°C.) | Percentage of oil recovered |
| --- | --- |
| 30 | 49% |
| 50 | 76% |
| 70 | 90% |
| 80 | 90% |

We claim:

1. In a process for preparing a soluble instant coffee powder wherein roasted ground coffee is extracted in a countercurrent fashion to obtain an extract and wherein the extract is filtered, the improvement comprising separating coffee oil from the filtered extract and then incorporating the oil into a soluble coffee powder.

2. A process according to claim 1 wherein the oil is separated form the extract by centrifuging.

3. A process according to claim 1 further comprising first centrifuging the filtered extract to separate suspended materials form the extract and then separating the oil form the extract.

4. A process according to claim 3 wherein the oil is separated from the extract by centrifuging the extract.

5. A process according to claim 1 wherein the extract from which the oil is separated has a temperature of from 70° C. to 80° C.

6. A process according to claim 2 wherein the extract from which the oil is separated has a temperature of form 70° C. to 80° C.

7. A process according to claim 3 wherein the extract from which the oil is separated has a temperature of form 70° C. to 80° C.

8. A process according to claim 4 wherein the extract from which the oil is separated has a temperature of from 70° C. to 80° C.

9. A process according to claim 1 further comprising deodorizing the oil separated form the extract to obtain a deodorized oil and then incorporating the deodorized oil into the powder.

10. A process according to claim 9 wherein the oil is deodorized by steam distillation.

11. A process according to claim 1 further comprising degumming the oil separated form the extract to obtain a degummed oil, then deodorizing the degummed oil to obtain a deodorized oil and then incorporating the deodorized oil into the powder.

12. A process according to claim 11 wherein the oil is degummed by an injection of steam.

* * * * *

UNITED STATES PATENT AND TRADEMARK OFFICE
CERTIFICATE OF CORRECTION

PATENT NO. : 5,236,729
DATED : August 17, 1993
INVENTOR(S) : Klaus SCHLECHT, et al.

It is certified that error appears in the above-identified patent and that said Letters Patent is hereby corrected as shown below:

Column 2, between lines 51-52, insert --SUMMARY OF THE INVENTION--.

Column 3, line 12, after "in", insert --a--.

Column 5, in each of lines 24, 27 and 28 (line 2 of claim 2 and lines 3 and 4 of claim 3), change "form" to --from--.

Column 6, in each of lines 8, 11 and 16 (line 3 of claim 6, line 3 of claim 7 and line 2 of claim 9), change "form" to --from--.

Signed and Sealed this

Eighth Day of March, 1994

Attest:

BRUCE LEHMAN

Attesting Officer    Commissioner of Patents and Trademarks